United States Patent
Kim (10) Patent No.: US 8,537,389 B2
(45) Date of Patent: Sep. 17, 2013

(54) DLNA DEVICE AND IMAGE FORMING METHOD THEREOF

(75) Inventor: Dae-Hyun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 674 days.

(21) Appl. No.: 12/654,793

(22) Filed: Jan. 4, 2010

(65) Prior Publication Data

US 2011/0051175 A1    Mar. 3, 2011

(30) Foreign Application Priority Data

Aug. 28, 2009  (KR) .............. 2009-0080676

(51) Int. Cl.
*G06F 3/12* (2006.01)
*G06K 15/00* (2006.01)

(52) U.S. Cl.
USPC .......... 358/1.15; 358/1.1; 358/1.13; 358/1.16

(58) Field of Classification Search
None
See application file for complete search history.

(56) References Cited

U.S. PATENT DOCUMENTS

| | | | | |
|---|---|---|---|---|
| 2003/0107750 A1* | 6/2003 | Takamine et al. | ............ | 358/1.1 |
| 2004/0066536 A1* | 4/2004 | Takamine et al. | ............ | 358/1.15 |
| 2005/0068572 A1* | 3/2005 | Hart et al. | ............ | 358/1.15 |
| 2005/0198566 A1* | 9/2005 | Takamine et al. | ............ | 715/513 |
| 2006/0007479 A1* | 1/2006 | Henry et al. | ............ | 358/1.15 |
| 2006/0251455 A1* | 11/2006 | Kim et al. | ............ | 400/62 |
| 2007/0177188 A1* | 8/2007 | Wollmershauser et al. | . | 358/1.15 |
| 2008/0049252 A1* | 2/2008 | Sakuda | ............ | 358/1.15 |
| 2009/0094317 A1* | 4/2009 | Venkitaraman | ............ | 709/203 |
| 2010/0161792 A1* | 6/2010 | Palm et al. | ............ | 709/224 |
| 2010/0161822 A1* | 6/2010 | Palm et al. | ............ | 709/231 |
| 2010/0162328 A1* | 6/2010 | Karaoguz et al. | ............ | 725/80 |

FOREIGN PATENT DOCUMENTS

GB   2 393 828 A   4/2004
KR   10-2007-0069598   7/2007

OTHER PUBLICATIONS

Extended European Search Report issued Nov. 23, 2012 in corresponding European Application No. 10158017.3.

* cited by examiner

*Primary Examiner* — Satwant Singh
(74) *Attorney, Agent, or Firm* — Staas & Halsey LLP

(57) ABSTRACT

A DLNA device includes a communication interface to receive at least one of content and content information through the Internet or receive at least one of content and content information which are stored in a device within the DLNA network, a storage unit to store the received content and content information, a user interface to display the content based on the content information and receive a printing command for the content from a user, a printing job generation unit to generate printing data for the content, based on the content information and the printing command from the user, and a controller to control the communication interface such that the generated printing data is printed by the image forming apparatus.

19 Claims, 8 Drawing Sheets

| Content Name | Original Location | Content Storage Location | Content Type |
|---|---|---|---|
| a.jpg | http://www.a.com/a.jpg | ₩₩device_a₩jpg₩a.jpg | image/jpeg |
| b.htm | http://www.b.com/b.htm | ₩₩device_b₩htm₩b.htm | text/html |
| c.xml | http://www.c.com/c.xml | ₩₩device_c₩xml₩c.xml | text/xml |
| d.txt | http://www.d.com/d.txt | ₩₩device_d₩txt₩d.txt | text/plain |

FIG. 3

| Template description | Template Name | Content Storage Location | Required Content Type |
|---|---|---|---|
| Fit-to Page | a.htm | ₩₩device_s₩htm₩a.htm | image/jpeg |
| eBook | b.htm | ₩₩device_s₩htm₩b.htm | text/plain |
| Address Book | c.htm | ₩₩device_s₩htm₩c.htm | text/xml |
| ... | ... | ... | ... |

DLNA DEVICE AND IMAGE FORMING METHOD THEREOF

CROSS-REFERENCE TO RELATED APPLICATIONS

This application claims the benefit of Korean Patent Application No. 10-2009-80676, filed on Aug. 28, 2009, in the Korean Intellectual Property Office, the disclosure of which is incorporated herein by reference.

BACKGROUND

1. Field

The embodiments generally relate to a digital living network alliance (DLNA) device and an image forming method thereof, and more particularly, to a DLNA device which performs a printing job with respect to diverse contents searched through an external network, such as the Internet, and an image forming method thereof.

2. Description of the Related Art

An image forming apparatus generally refers to an apparatus that prints printing data generated by a terminal device, such as a computer, on a recording medium. Examples of such an image forming apparatus include copiers, printers, facsimile machines, and multifunction peripherals (MFPs) incorporating the functions of the aforementioned devices into a single device.

The image forming apparatus receives a printing job from a terminal device such as a computer, and recently, supports the DLNA standard to be able to receive a printing job from diverse DLNA devices.

The DLNA is founded to establish a standard for digital information technology products to allow data, such as music, photos, and moving pictures, to be shared among devices. The DLNA aims to establish a compatible platform based on the already established industry standard and to realize convergence across the industries. The DLNA promotes the introduction of a guideline among the industries based on the UPnP (Universal Plug and Play) protocols which have been widely used in the manufacture of home appliances, personal computers, and wireless devices.

Therefore, the user can enjoy diverse content within a DLNA network using the DLNA device, and outputs the content through an image forming apparatus in the DLNA network.

A recent DLNA device can be connected to an external Internet as well as a DLNA network, so that the user can obtain more diverse content, such as a web-page from the external Internet.

However, the DLNA print standard of the related art does not define a method for outputting content searched through an external network (Internet), and therefore, it is not easy to output the content using a DLNA printer.

SUMMARY

Accordingly, it is an aspect of the embodiments to provide a DLNA device which performs a printing job with respect to diverse content searched through an external network, and an image forming method thereof.

Additional aspects and/or advantages will be set forth in part in the description which follows and, in part, will be apparent from the description, or may be learned by practice of the embodiments.

The foregoing and/or other aspects of the embodiments are achieved by providing a digital living network alliance (DLNA) device which is connected to an image forming apparatus through a DLNA network and is connected to an external network, the DLNA device including: a communication interface to receive content and content information through the external network or receive content and content information which are stored in a device within the DLNA network, a storage unit to store the received content and content information, a user interface to display the received content based on the content information and receive a printing command for the content from a user, a printing job generation unit to generate printing data for the content, based on the content information and the printing command from the user, and a controller to control the communication interface such that the generated printing data is printed by the image forming apparatus.

The content may be image data, text data, an HTML document, an XML document or a file which can be direct-printed by the image forming apparatus without an additional converting process.

If a printing command for a certain area of the content is received, the printing job generation unit may generate new content corresponding to the certain area of the content and generate printing data for the generated content.

The storage unit may store the generated new content and information about the new content in the form of a lookup table.

The storage unit may store a plurality of templates which are written by XHTML-Print data, the user interface may receive selection of one of the plurality of templates, and the printing job generation unit may generate printing data by combining the selected template and the selected content.

The printing data may be XHTML-Print data.

The storage unit may store name, storage location, and type of the received content in the form of a lookup table.

If a request to provide the content is received from the image forming apparatus, the controller may control the communication interface to transmit the content using the lookup table in response to the request.

The controller may process the received content such that the received content is shared across the DLNA network.

The foregoing and/or other aspects of the embodiments may also be achieved by providing an image forming method of a DLNA device which is connected to an image forming apparatus through a DLNA network and is connected to an external network, the image forming method including: receiving content and content information through the external network or receiving content and content information which are stored in a device within the DLNA network, storing the received content and content information, receiving a printing command for the content from a user, generating printing data for the received content, based on the content information and the printing command from the user, and transmitting the generated printing data to the image forming apparatus.

The content may be image data, text data, an HTML document, an XML document, or a file which can be direct-printed by the image forming apparatus without an additional converting process.

The image forming method may further include displaying the content based on the content information, and, if a printing command for a certain area of the content is received, the generating may include generating new content corresponding to the certain area of the content and generating printing data for the generated content.

The image forming method may further include storing the generated new content and information about the new content in the form of a lookup table.

The displaying may include displaying a plurality of templates which are written by pre-stored XHTML-Print data, and, if one of the plurality of templates is selected, the generating may include generating printing data by combining the selected template and the selected content.

The printing data may be XHTML-Print data.

The image forming method may further include storing name, storage location, and type of the received content in the form of a lookup table.

The image forming method may further include, if a request to provide content is received from the image forming apparatus, transmitting the content using the lookup table in response to the request.

The image forming method may further include processing the received content such that the content is shared across the DLNA network.

BRIEF DESCRIPTION OF THE DRAWINGS

These and/or other aspects and advantages will become apparent and more readily appreciated from the following description of the embodiments, taken in conjunction with the accompanying drawings of which:

FIGS. 4A to 5B are views illustrating various examples of a UI window displayed on a user interface according to embodiments;

DETAILED DESCRIPTION OF EMBODIMENTS

Reference will now be made in detail to the embodiments, examples of which are illustrated in the accompanying drawings, wherein like reference numerals refer to the like elements throughout.

Figure 1:
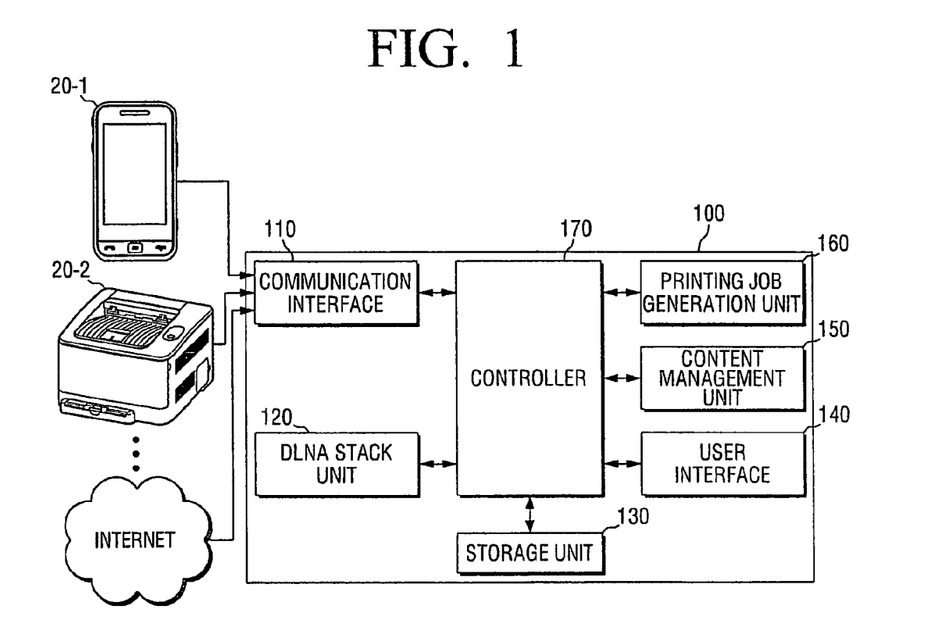
FIG. 1 is a block diagram illustrating a DLNA device according to an exemplary embodiment.

FIG. 1 is a block diagram illustrating a DLNA device according to an exemplary embodiment.

Referring to FIG. 1, a DLNA device 100 shares content with other DLNA devices (20-1, 20-2, etc) in a DLNA network and outputs content by accessing a DLNA image forming apparatus in the DLNA network. For example, the DLNA device 100 may be a digital media server (DMS), a digital media player (DMP), or a digital media renderer (DMR), which are prescribed by the DLNA guidelines. The DMS provides a function of a media server device (MSD) in the UPnP AV area, that is, provides digital media content, and also, searches for digital media content items within the DMS so that a user of the DLNA network can display or distribute the content. For example, the DMS may include a videocassette recorder (VCR), CD player, a DVD player, a MP3 player, a set-top box, a TV tuner, a radio tuner, or a PC. The DMR executes selected media and may include a TV or a stereo speaker. The DMP refers to a DMR including a UPnP control point (CP), and executes the functions of a media renderer device (MRD) or a media render control point (MRCP), that is, selects and controls media content and executes the selected media content.

More specifically, the DLNA device 100 may include a communication interface 110, a DLNA stack unit 120, a storage unit 130, a user interface 140, a content management unit 150, a printing job generation unit 160, and a controller 170.

The communication interface 110 is connected to the DLNA network and shares content with other DLNA devices 20-1, 20-2 in the DLNA network. The DLNA device 20-2 is an image forming apparatus 20-2. More specifically, the communication interface 110 communicates with the DLNA device 20-1 or the image forming apparatus 20-2 in the DLNA network according to the UPnP standard to exchange content and content information with the other DLNA devices. If a user inputs a command to print, the communication interface 110 may request the image forming apparatus 20-2 in the DLNA network to perform a printing job and may receive a job ID or a URL address (a destination address to send printing data) of a corresponding printing job from the image forming apparatus 20-2. Also, the communication interface 110 may transmit printing data which is generated by the printing job generation unit 160, to the image forming apparatus 20-2 and may transmit content regarding the printing data.

The communication interface 110 may connected to an external network such as the Internet to receive content and content information through the extended network. More specifically, the communication interface 110 may be connected to the Internet (for example, a web page or an FTP server) through an external gateway, and may receive diverse content and content information through the Internet. The communication interface 110 may be connected to the Internet in a wired or wireless manner and may be connected to the Internet via another DLNA device connected to the Internet. Although one communication interface 110 is connected to both the Internet and the DLNA network in this embodiment, a plurality of communication interfaces may be provided to be individually connected to the Internet and the DLNA network.

The content recited herein refers to image data, text data, an HTML document, or a file which can be direct-printed by the image forming apparatus 20-2. The direct-printing refers to a printing method that can perform a printing job simply by transmitting a corresponding file to an image forming apparatus without an additional file converting process. For example, JPG, PDF, and XPS files are examples of files that can be direct-printed. The content information recited herein includes address information, names, information, and layout of contents, and cascading style sheets (CSS).

The DLNA stack unit 120 controls the communication interface 110 to communicate with a DLNA device or a DLNA printer in the DLNA network according to the DLNA standard and the DLNA printer standard. More specifically, the DLNA stack unit 120 generates a device description based on a core protocol which is necessary for the DLNA operation, and controls the communication interface 110 to request the image forming apparatus 20-2 in the DLNA network to perform a printing job in the UPnP method. Although the DLNA stack unit 120 is a separate element in this embodiment, the function of the DLNA stack unit 120 and the function of the communication interface 110 may be incorporated into a single element.

Figure 2:
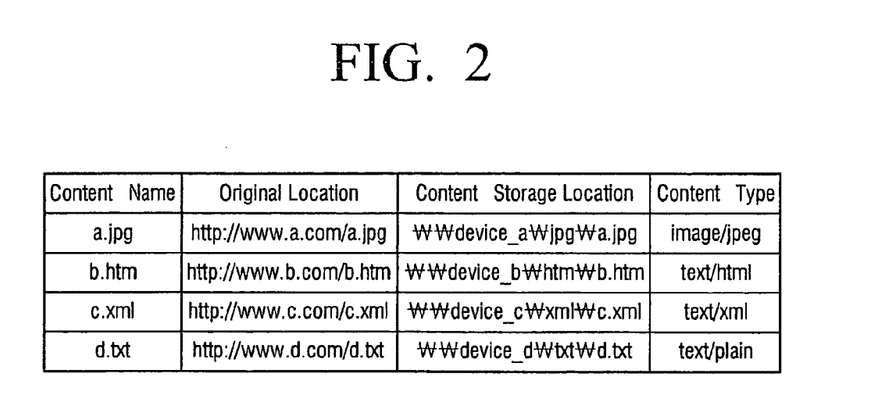
FIG. 2 is a view illustrating an example of a lookup table regarding content according to an embodiment.

The storage unit 130 stores the content. More specifically, the storage unit 130 pre-stores diverse content and stores content and content information received through the communication interface 110. Also, the storage unit 130 may store names of content, storage location of content, reception location of content, and types of content in the form of a lookup table. An example of the lookup table is illustrated in FIG. 2. Also, the storage unit 130 may pre-store a plurality of templates. The storage unit 130 may store content and printing data which are generated by the printing job generation unit 160, as will be described later. The storage unit 130 may be realized as an internal storage medium or an external storage medium of the DLNA device 100, for example, a removable disk including a USB memory, a storage medium connected to a host, or a web server over a network.

The template recited herein refers to an image that is generated by a user or an image forming apparatus for the purpose of being combined with image data given to the image forming apparatus, and various templates may be provided according to types of content.

The user interface 140 has a plurality of function keys to allow a user to set or select various functions supported by the DLNA device 100, and displays information provided from the DLNA device 100. The user interface 140 may be a device which realizes input and output simultaneously, such as a touch pad, or may be a device which combines a mouse and a monitor. The user interface 140 may display content based on content information. Accordingly, the user can search for diverse content, such as a web page, through a user interface (UI) window. Also, the user may select content to be printed from among the content displayed on the UI window. At this time, the user may select an area of content to be output through the UI window and may select diverse print options regarding the output of content.

Also, the user interface 140 may display diverse templates in response to a printing command from the user. More specifically, in response to a printing command from the user, the user interface 140 may search for a template corresponding to content selected by the user, based on a pre-stored lookup table regarding templates, and may display the searched template for the user. Accordingly, the user can select the layout of the output easily.

The content management unit 150 controls the user interface 140 to display received content based on content information. More specifically, the content management unit 150 may parse, decode and render the content received through the communication interface 110 based on the content information, and may control the user interface 140 to display the rendered content. For example, if the received content is an image, the content management unit 150 decodes the corresponding image and controls the user interface 140 to display the decoded image, and, if the received content is a document written by a markup language such as an HTML document, the content management unit 150 controls the user interface 140 to display a UI window, such as a web browser. If the received content is written by an extensible markup language (XML), the content management unit 150 controls the user interface 140 to apply a specific style to each component with reference to content information, such as CSS, and display the content. Also, if the received content includes information such as address book, news, and RSS (Rich Site Summary), the content management unit 150 converts the content into text-based XHTML, stores the converted XHTML in the storage unit 130, and controls the user interface 140 to display the converted XHTML.

Although the content management unit 150 is a separate element in this embodiment, the function of the content management unit 150 may be incorporated into the user interface 140.

The printing job generation unit 160 generates printing data regarding content based on content information and a printing command from a user. More specifically, if a printing command is input from the user, the content selected by the user may be converted into printing data which is readable by the DLNA network printer. The generated printing data may be in the format of XPC (XHTML-Print Content or XHTML-Print data) or may be in the format of MPX (MIME Multi-plexed Content Type). If the content selected by the user is a file that can be direct-printed, the file may be treated as printing data without an additional converting process.

If a printing command is input from the user, the printing job generation unit 160 may control the user interface 140 to display a UI window to select a template, and may generate printing data by combining the selected template and the selected content.

If the printing command from the user is to print a certain area of the content, the printing job generation unit 160 may extract the certain area from the received content, generate the extracted area as new content, and convert the generated new content into printing data. For example, if the user selects a specific area of 50×50 (in pixels) size from an image of 100×100 size as a printing area, the printing job generation unit 160 extracts an image regarding the selected area and converts the image of the extracted area into printing data. The generated content may be stored in the storage unit 130 and the lookup table may be updated with the generated content.

The controller 170 controls the generated printing data to be printed. More specifically, the controller 170 controls the communication interface 110 to transmit the printing data generated by the printing job generation unit 160 to the image forming apparatus 20-2 in the DLNA network, such that the image forming apparatus 20-2 prints the printing data. The detailed operation of this will be described later with reference to FIG. 6.

The controller 170 may display a preview of printing data to be output. More specifically, the controller 170 may control the user interface 140 to display the preview of printing data to be output so that the user can check how the corresponding content is output in advance.

The controller 170 may store the generated printing data in the storage unit 130. More specifically, since the same content may be repeatedly printed, the controller 170 stores the printing data in the storage unit 130 and performs the printing job rapidly using the pre-stored printing data at a later time when a printing command for the same content is input.

Also, the controller 170 may set the received content and the generated content as a shared content in the DLNA network. More specifically, the controller 170 shares the content received through the communication interface 110 and the content generated by the printing job generation unit 160 so that another DLNA device in the DLNA network can use the content received through the Internet.

Also, if a request to provide content is received from the image forming apparatus 20-2, the controller 170 may control the communication interface 110 to transmit the requested content. More specifically, according to the DLNA printer standard, content may be omitted from printing data transmitted from the DLNA device 100. For example, if a printing job for an image is to be performed, an image file itself is not included in printing data and the image is transmitted to an image forming apparatus through a separate process. Accordingly, according to the DLNA printer standard, a DLNA device can perform a printing job with respect to content stored in another DLNA device. If a request for content is received, the controller 170 may transmit the corresponding content to the image forming apparatus 20-2 using the stored lookup table.

As described above, the DLNA device 100 can easily perform a printing job with respect to diverse content searched by the user through the Internet.

FIG. 2 is a view illustrating an example of the lookup table regarding the content.

An example of a lookup table regarding content received through the Internet is illustrated in FIG. 2. The lookup table of FIG. 2 includes information regarding names of content, original location of content, storage location of content, and type of content, and contains information regarding 4 different contents. If a specific content is requested, a location where the content is stored can be identified and a template corresponding to the content can be easily searched when printing data regarding the content is generated.

Figure 3:
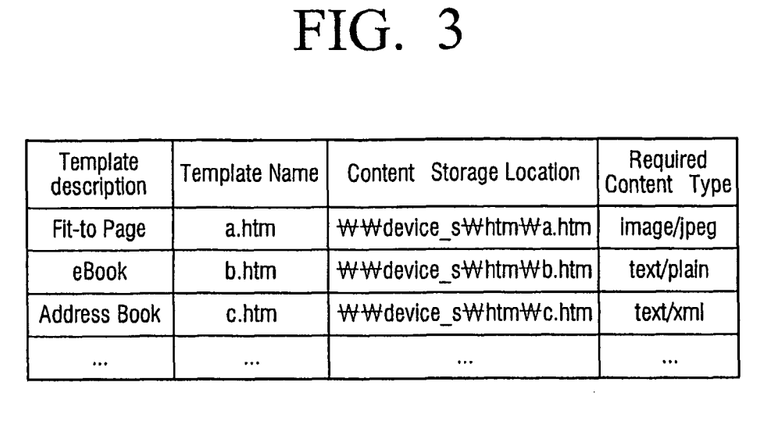
FIG. 3 is a view illustrating an example of a lookup table regarding templates according to an embodiment.

FIG. 3 is a view illustrating an example of a lookup table regarding templates.

An example of a lookup table regarding templates which is previously stored in the storage unit 130 is illustrated in FIG. 3. The lookup table of FIG. 3 contains template description, template name, storage location of templates, and types of content combinable with templates. Based on the lookup table, a template corresponding to the content selected by the user can be easily searched.

FIGS. 4A to 5B are views illustrating examples of a UI window displayed on the user interface.

Figure 4A:
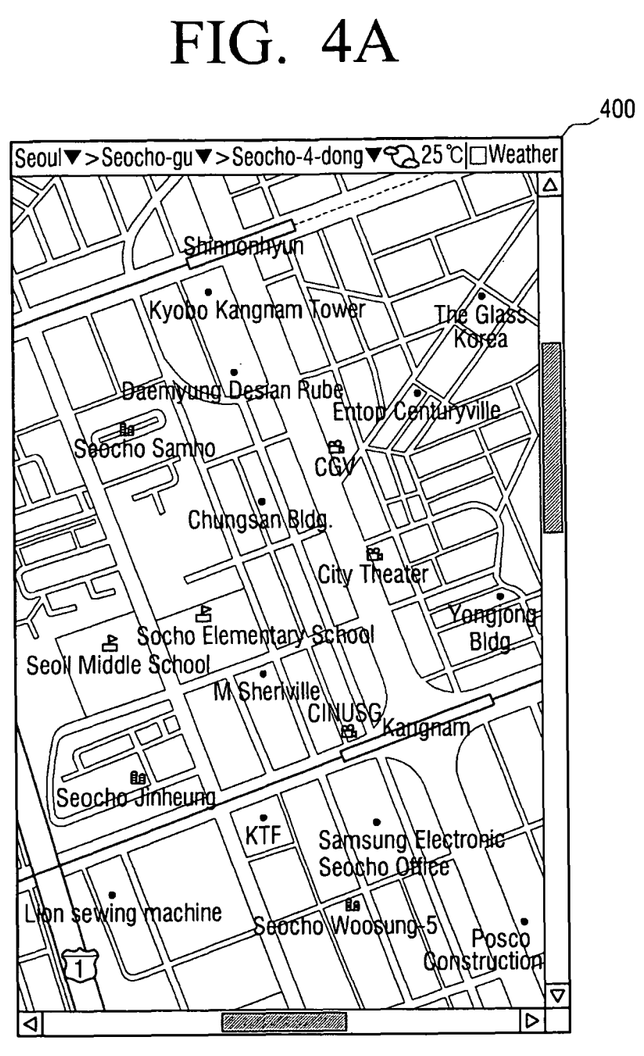
Figure 4B:
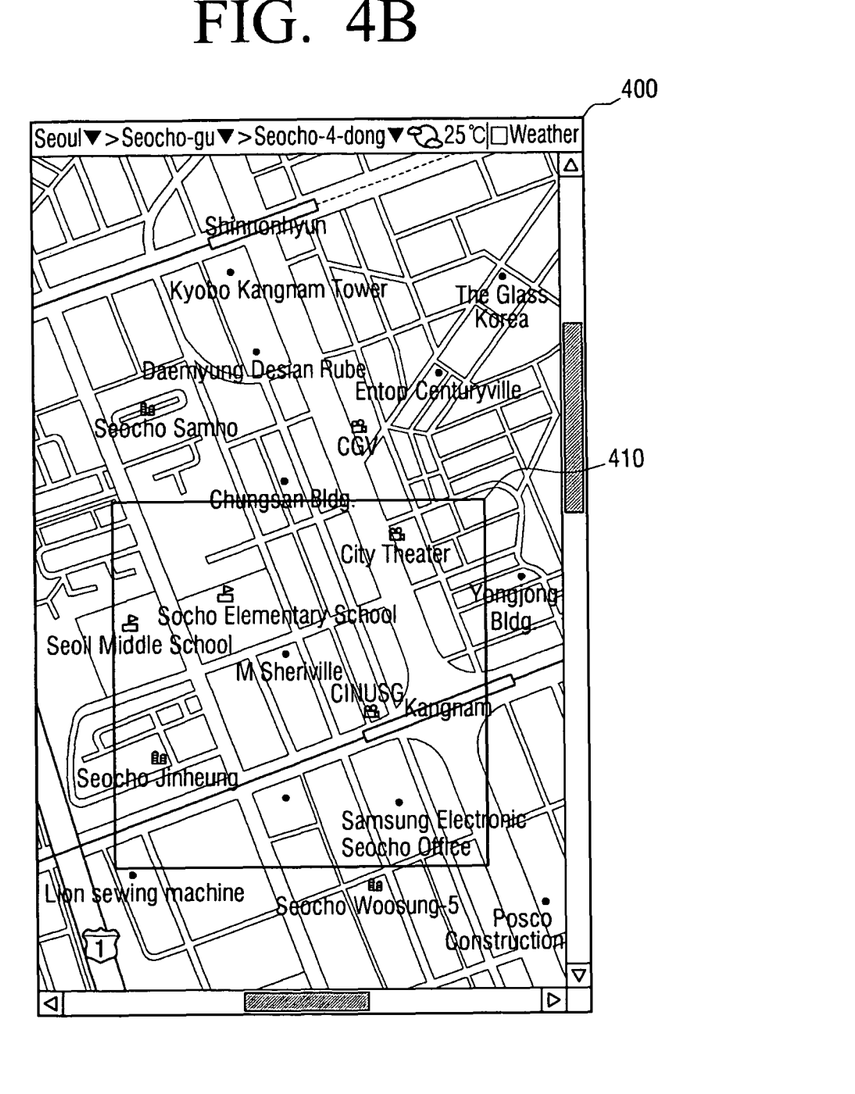

FIGS. 4A and 4B illustrate an example of a UI window 400 on which a map image searched by the user through the Internet is displayed. Referring to FIG. 4A, the user may obtain a map content received through the Internet and input a command to print the map content. In this case, an image which is the same as the image displayed on the UI window 400 may be printed. It can be seen that the UI window 400 does not display the entire map image. Therefore, if a printing command for the displayed map image is input, the entire map image may be printed although it is not displayed on the UI window 400.

Referring to FIG. 4B, the user may obtain the map content received through the Internet and input a command to print a certain area 410 of the map content. In this case, the DLNA device 100 extracts only the image corresponding to the area 410 and performs a printing job with respect to the extracted image.

Figure 5A:
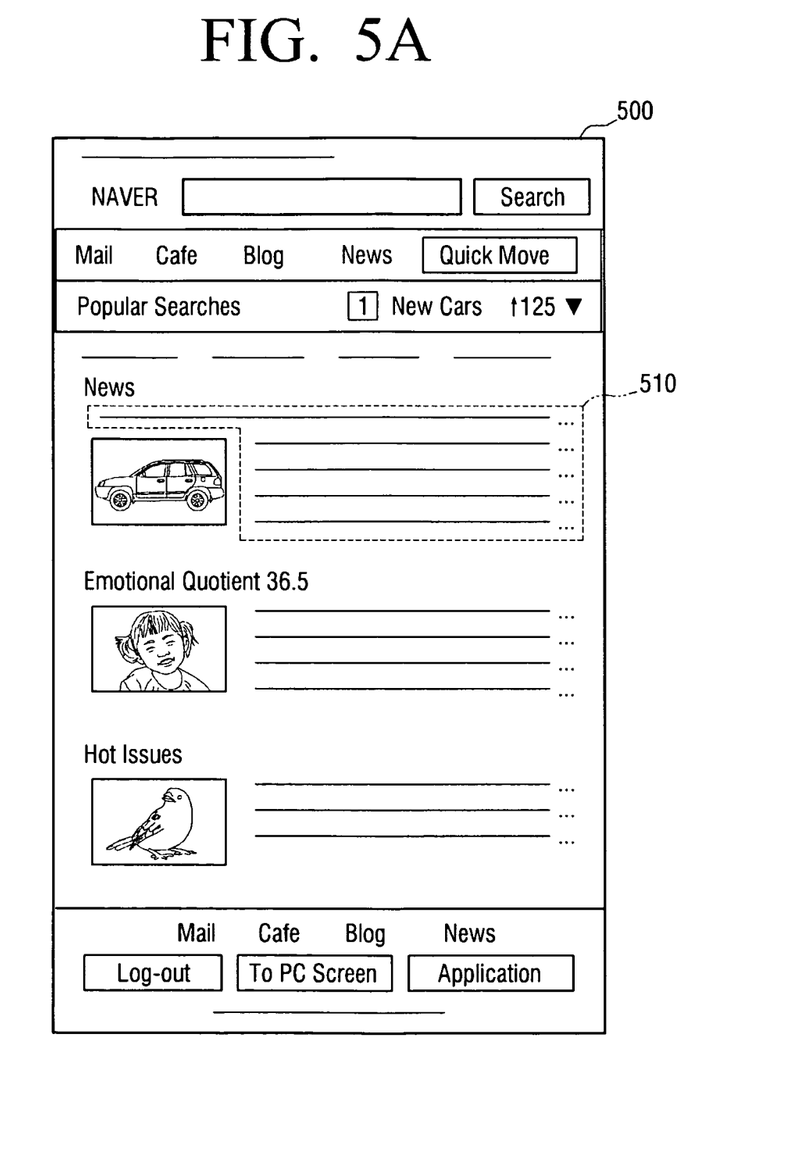
Figure 5B:
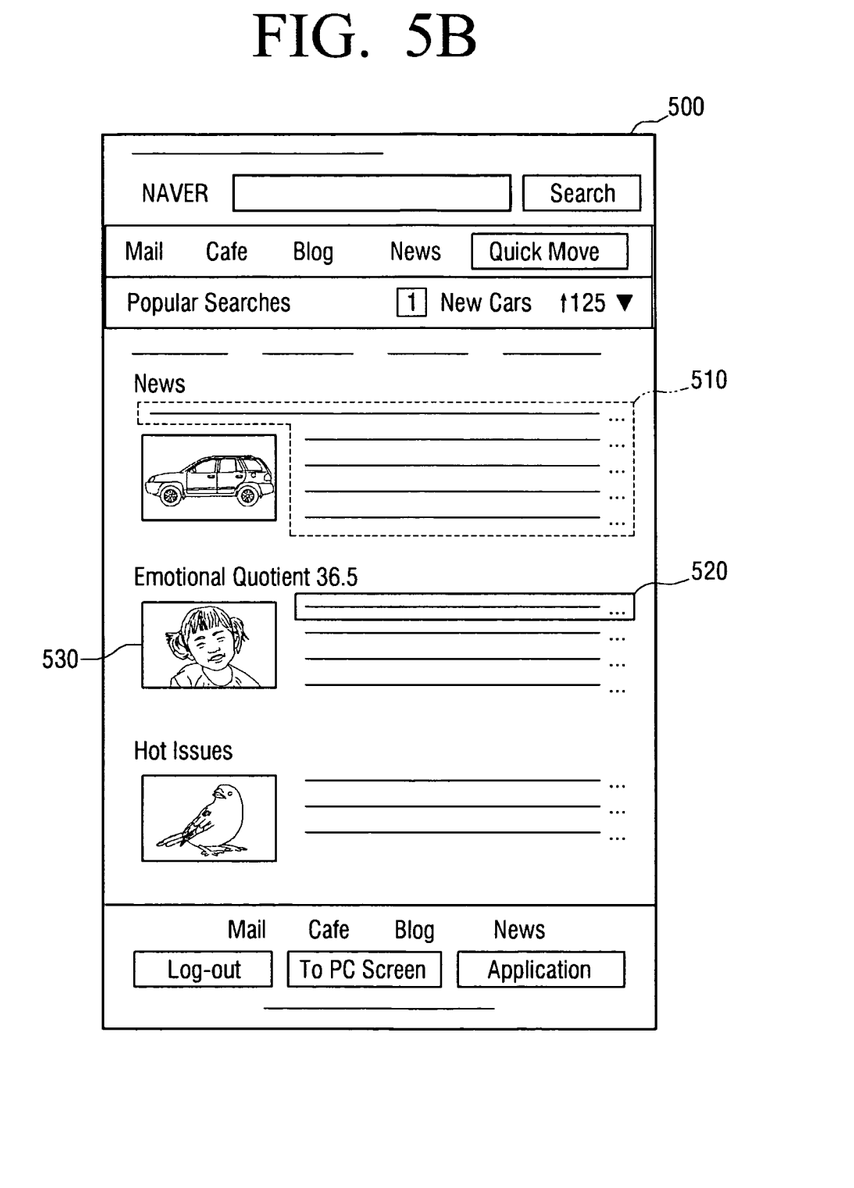

FIGS. 5A and 5B illustrate an example of a UI window 500 on which a web page searched by the user through the Internet is displayed. Referring to FIG. 5A, a web page searched through the Internet is displayed. If the user selects a certain text area 510 and requests the certain text area 510 to be printed, the DLNA device 100 performs a printing job with respect to the text area 510. The output is printed in the form of "¬" as shown in FIG. 5A and may be printed with another layout according to a user's selection (template selection).

FIG. 5B illustrates a web page searched through the Internet. If the user selects an image content 530 from the web page and requests the image content 530 to be printed, the DLNA device 100 performs a printing job with respect to the image content 530. If the user selects an area 520 including a link to another web page and requests the area 520 to be printed, the DLNA device 100 may output a text corresponding to the link and performs a printing job with respect to an HTML document linked to the area 520.

Figure 6:
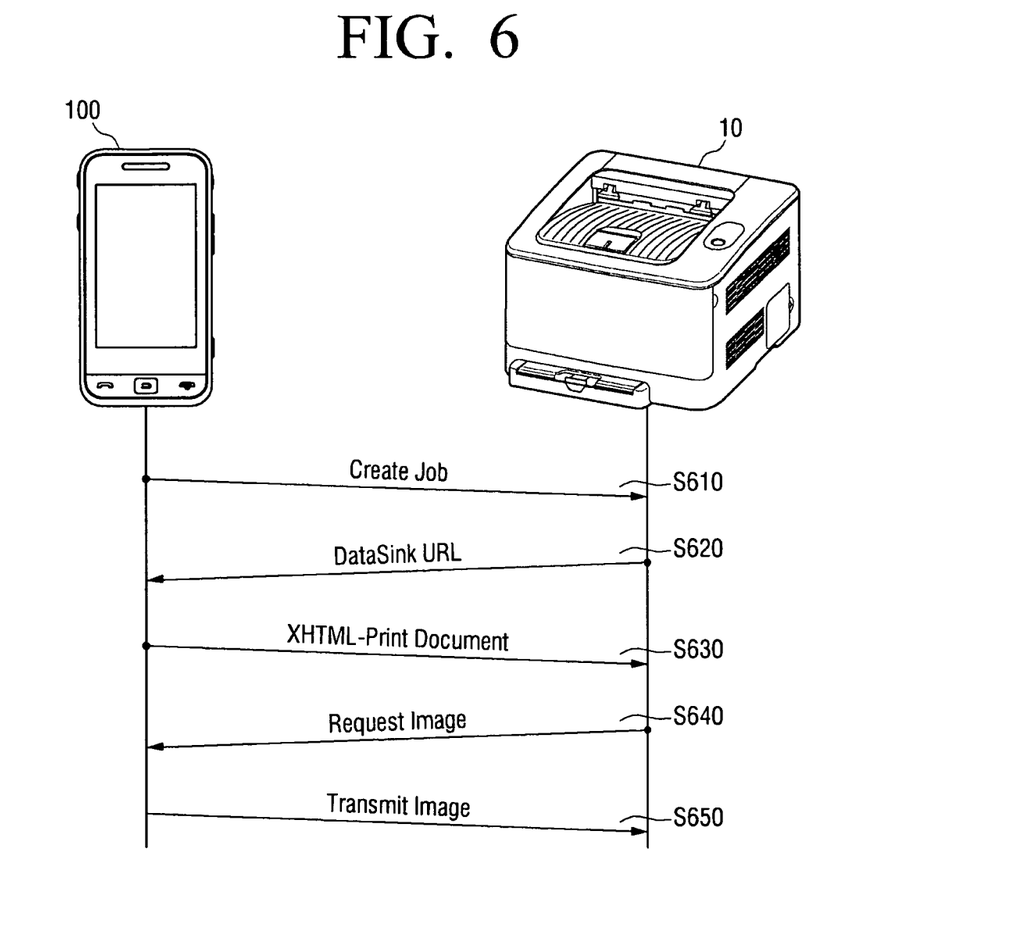
FIG. 6 is a view to explain operation of the DLNA device according to an exemplary embodiment.

FIG. 6 is a view illustrating operation of transmitting printing data by the DLNA device according to an exemplary embodiment.

Referring to FIG. 6, if printing data for content is generated in response to a printing command from a user, the DLNA device 100 requests an image forming apparatus 10 to create a printing job (S610). In response to the request, the image forming apparatus 10 transmits a job ID regarding the printing job and an address to which the printing data is to be transmitted (DataSink URL) to the DLNA device 100 (S620). The DLNA device 100 transmits the generated printing data to the received address.

As described above, the printing data and the content may be separately transmitted to the image forming apparatus 10. For example, if a printing command from a user is to print a content stored in another DLNA device in the DLNA network, printing data generated by a current DLNA device is transmitted to the image forming apparatus 100, whereas the content is transmitted to another DLNA device (S630). However, since another DLNA device is not aware of the printing job regarding the content, the image forming apparatus 10 grasps an address where the corresponding content is stored based on the printing data and requests another DLNA device corresponding to the address to transmit the content (image) (S640). In response to the request, the image forming apparatus 10 receives the content (image) transmitted by the other DLNA device (S650).

Figure 7:
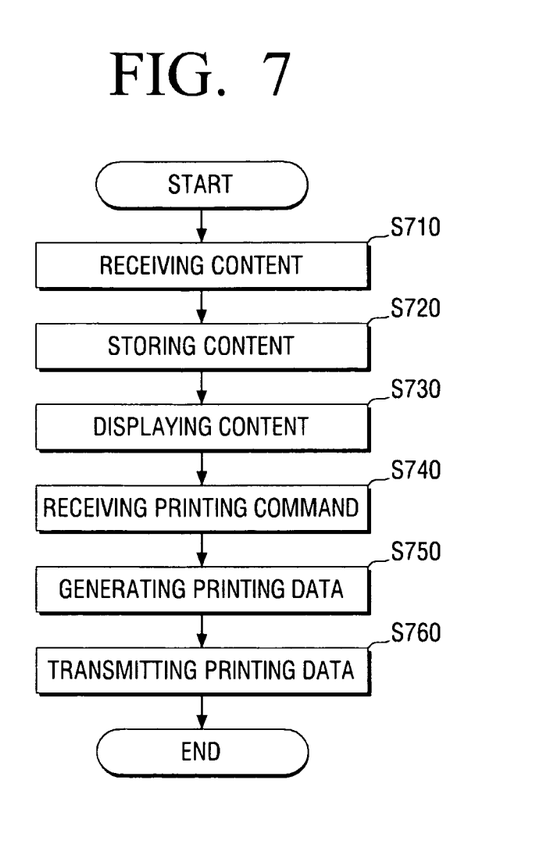
FIG. 7 is a flowchart illustrating an image forming method according to an exemplary embodiment.

FIG. 7 is a flowchart illustrating an image forming method according to an exemplary embodiment.

A content and content information are received through the Internet (S710). More specifically, diverse content and content information may be received in response to a user's Internet search and a user's search for content through the Internet. The content recited herein includes image data, text data, an HTML document, and a file which can be direct-printed by an image forming apparatus. The content information recited herein may include address information, names, information, and layouts of content and cascading style sheets (CSS).

The received content and content information are stored (S720). More specifically, the content and the content information which are received through the Internet are stored. Simultaneously, a lookup table containing the name of content, storage location of content, reception location of content, and type of content is generated and stored.

The content is displayed (S730). More specifically, the content is parsed, decoded, and rendered based on the content information, and the rendered content is displayed. For example, if the received content is an image, the image is decoded and displayed. If the received content is a document written by a markup language such as HTML, a UI window such as a web browser is displayed. If the received content is written by XML, a specific style is applied to each component with reference to content information such as CSS and the content is displayed. Accordingly, a user can search diverse content, such as a web page, over the Internet through the UI window, and select content to be printed from among the displayed content. Simultaneously, the user may select an area to be output from the content using the UI window and may select diverse print options regarding the content output.

If a command to print the content is received from the user (S740), printing data regarding the content is generated based on the content information and the printing command from the user (S750). More specifically, upon receipt of the printing command from the user, the content selected by the user is converted into printing data which is readable by the DLNA network printer. The generated printing data may be in the format of XPC (XHTML-Print Content or XHTML-Print data) or MPX (MIME Multiplexed content type). If the content selected by the user is a file which can be direct-printed, the file can be treated as printing data without an additional converting process. The printing data may be generated using a pre-stored template. More specifically, if a printing command from the user is input, a UI window to select a pre-stored template is displayed and printing data is generated by combining the template selected by the user with the content selected by the user. If the printing command from the user is to print a certain area of the content, new content corresponding to the certain area is generated and is converted into printing data. The generated printing data may be stored.

The generated printing data is transmitted to the image forming apparatus connected in the DLNA network (S760). More specifically, the image forming apparatus in the DLNA network is requested to print the printing data. The DLNA device 100 receives a job ID and a URL address regarding the printing job from the image forming apparatus and transmits the generated printing data to the URL address to perform the printing job. A preview showing the output of generated printing data may be displayed.

If a request to provide content is received from the image forming apparatus, the DLNA device 100 may transmit the requested content. More specifically, since the content may be omitted from the printing data transmitted by the DLNA device 100 according to the DLNA printer standard, the DLNA device 100 may transmit the content to the image forming apparatus in response to the request to provide the content.

According to the image forming method described above, the diverse content searched by the user through the Internet can be printed. The image forming method of FIG. 7 may be executed by the DLNA device 100 having the configuration of FIG. 1 and may be executed by any other type of DLNA device.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A digital living network alliance (DLNA) device which is connected to an image forming apparatus through a DLNA network and is connected to an external network, the DLNA device comprising:
    a communication interface to receive at least one of content and content information through the external network or receive at least one of content and content information which are stored in a device within the DLNA network;
    a storage unit to store the received at least one of content and content information;
    a user interface to display the received content based on the content information and receive a printing command for the content from a user;
    a printing job generation unit to generate printing data for the content, based on the content information and the printing command from the user; and
    a controller to control the communication interface such that the generated printing data is printed by the image forming apparatus.

2. The DLNA device as claimed in claim 1, wherein the content is at least one of image data, text data, an HTML document, an XML document, a file which can be direct-printed by the image forming apparatus without an additional converting process, or combinations thereof.

3. The DLNA device as claimed in claim 1, wherein, if a printing command for a certain portion of the content is received, the printing job generation unit generates a new content corresponding to the certain portion of the content and generates printing data for the generated new content.

4. The DLNA device as claimed in claim 3, wherein the storage unit stores the generated new content and information about the new content in the form of a lookup table.

5. The DLNA device as claimed in claim 1, wherein the communication interface receives a plurality of the contents, and the storage unit stores a plurality of templates which are written by XHTML-Print data, the user interface receives a selection of one of the plurality of templates, and the printing job generation unit generates printing data by combining the selected template and a selected one of the contents.

6. The DLNA device as claimed in claim 1, wherein the printing data is XHTML-Print data.

7. The DLNA device as claimed in claim 1, wherein the storage unit stores at least one of a name, a storage location, a type of the received content, or combinations thereof, in the form of a lookup table.

8. The DLNA device as claimed in claim 7, wherein, if a request to provide the content is received from the image forming apparatus, the controller controls the communication interface to transmit the content using the lookup table in response to the request.

9. The DLNA device as claimed in claim 1, wherein the controller processes the received content such that the received content is shared across the DLNA network.

10. The DLNA device as claimed in claim 1, wherein the external network is an internet.

11. An image forming method of a digital living network alliance (DLNA) device which is connected to an image forming apparatus through a DLNA network and is connected to an external network, the image forming method comprising:
    receiving at least one of content and content information through the external network or receiving at least one of content and content information which are stored in a device within the DLNA network;
    storing the received at least one of content and content information;
    receiving a printing command for the content from a user;
    generating printing data for the received content, based on the content information and the printing command from the user; and
    transmitting the generated printing data to the image forming apparatus.

12. The image forming method as claimed in claim 11, wherein the content is at least one of image data, text data, an HTML document, an XML document, a file which can be direct-printed by the image forming apparatus without an additional converting process, or combinations thereof.

13. The image forming method as claimed in claim 11, further comprising:
    displaying the content based on the content information; and
    receiving a printing command for a certain portion of the content,
    wherein the generating comprises generating a new content corresponding to the certain portion of the content and generating printing data for the generated content in response to the receiving the printing command for the certain portion.

14. The image forming method as claimed in claim 13, further comprising storing the generated new content and information about the new content in the form of a lookup table.

15. The image forming method as claimed in claim 13, wherein the displaying comprises displaying a plurality of templates which are written by pre-stored XHTML-Print data, the method further comprising:

selecting one of the plurality of templates; and generating the printing data by combining the selected template and the selected content in response to the selecting the template.

16. The image forming method as claimed in claim 11, wherein the printing data is XHTML-Print data.

17. The image forming method as claimed in claim 11, further comprising storing at least one of a name, a storage location, a type of the received content, or combinations thereof, in the form of a lookup table.

18. The image forming method as claimed in claim 17, further comprising:

receiving a request to provide content is from the image forming apparatus; and transmitting the content using the lookup table in response to the receiving the request.

19. The image forming method as claimed in claim 11, further comprising processing the received content such that the content is shared across the DLNA network.

* * * * *